United States Patent [19]
Tao

[11] Patent Number: 6,039,278
[45] Date of Patent: *Mar. 21, 2000

[54] SPINNING REEL FOR FISHING

[75] Inventor: Ning Tao, Victoria, China

[73] Assignee: Jarvis Walker Pty. Ltd., Australia

[ * ] Notice: This patent is subject to a terminal disclaimer.

[21] Appl. No.: 09/238,717

[22] Filed: Jan. 28, 1999

Related U.S. Application Data

[63] Continuation of application No. 08/915,501, Aug. 21, 1997, Pat. No. 5,865,386.

[30] Foreign Application Priority Data

Aug. 23, 1996 [AU] Australia ................................ PO-1855

[51] Int. Cl.$^7$ .................................................. A01K 89/03
[52] U.S. Cl. ......................... 242/246; 242/244; 242/245
[58] Field of Search .................................... 242/244, 245, 242/246

[56] References Cited

U.S. PATENT DOCUMENTS

| | | | |
|---|---|---|---|
| 4,746,077 | 5/1988 | Toda . | |
| 4,834,307 | 5/1989 | Larsson et al. | 242/245 |
| 4,848,696 | 7/1989 | Patterson | 242/246 |
| 5,120,001 | 6/1992 | Kaneko | 242/246 |
| 5,186,412 | 2/1993 | Park | 242/245 |
| 5,195,695 | 3/1993 | Kyoichi | 242/246 |
| 5,199,664 | 4/1993 | Kuntze et al. | 242/246 |
| 5,201,477 | 4/1993 | Kawabe | 242/245 |
| 5,240,202 | 8/1993 | Park | 242/246 |
| 5,431,355 | 7/1995 | Takahashi | 242/246 |
| 5,511,735 | 4/1996 | Kaneko . | |
| 5,816,516 | 10/1998 | Yamaguchi . | |
| 5,865,386 | 2/1999 | Tao . | |

FOREIGN PATENT DOCUMENTS

| | | |
|---|---|---|
| 0 150 061 | 7/1985 | European Pat. Off. . |
| 0 429 923 | 6/1991 | European Pat. Off. . |
| 0 649 595 | 4/1995 | European Pat. Off. . |

*Primary Examiner*—Katherine A. Matecki
*Attorney, Agent, or Firm*—Jones & Askew

[57] ABSTRACT

A spinning reel for fishing 10 comprises a spool shaft 17 reciprocal in an axial direction during rotation of a handle shaft and a being provided at a first axial end of the spool shaft. The reel includes an adjustable drag mechanism 23 including a core block fixed to the spool shaft, provided at a second axial end of the shaft, opposite to the first axial end of the spool, a rotor for winding line onto the spool and a switch means for selectively engaging between a first "normal" drag state in which the spool shaft is inhibited from rotating a free spool state in which the spool shaft may be free to rotate subject to the adjustable drag mechanism. A switch mechanism associated with the switch means comprises a plate adapted to move parallel to the axis 17A of the spool shaft, between a first and a second stable positions. The plate defines a protrusion at one end.

When the switch is in the first of the two stable positions the protrusion is adapted to engage in a corresponding female slot in the core block to prevent rotation of the core block and hence the spool shaft.

The switch is movable to the second position in which the protrusion is disengaged from the female slot and the core block and spool are free to rotate relative to the switch.

19 Claims, 11 Drawing Sheets

SPINNING REEL FOR FISHING

This is a continuation of application Ser. No. 08/915,501 filed Aug. 21, 1997, now U.S. Pat. No. 5,865,386.

FIELD OF INVENTION

This invention relates to a spinning reel for fishing. In particular, it relates to a spinning reel of the type having a spool assembly including a spool shaft which reciprocates in an axial direction on rotation of a handle, the spool being provided at a first axial end of a spool shaft, and a drive mechanism being provided towards a second axial end of the spool shaft, opposite from the first axial end, and a rotor for winding line onto the spool.

BACKGROUND OF THE INVENTION

It is known in such spinning reels, to provide a means for switching the spinning reel between a free spool state in which the spool shaft is decoupled from a drag mechanism, and is free to rotate, and a drag state in which the spool shaft is operatively connected to a drag mechanism and inhibited from rotating.

One such spinning reel is described in U.S. Pat. No. 5,511,735. The mechanism described in the specification of that patent is complicated and there are a large number of moving parts and assemblies associated with switching the reel from a drag condition to a free spool condition. The complexity of the design of the spinning reel shown in U.S. Pat. No. 5,511,735 both in terms of the component design and the number of components makes the reel expensive to manufacture and unnecessarily complicated.

A number of different designs of spinning reels which also have a free spool function are described in U.S. Pat. No. 4,746,077 which share the same problems as U.S. Pat. No. 5,511,735 in terms of the complication and consequent expense of the components and the overall design.

The present invention seeks to provide a simpler design which is easier and cheaper to manufacture.

SUMMARY OF THE INVENTION

Thus, according to the present invention there is provided a spinning reel for fishing comprising:

a casing;

a spool shaft reciprocal in an axial direction during rotation of a handle shaft, a spool provided at a first axial end of the spool shaft, and an adjustable drag mechanism including a block fixed to the spool shaft, located at a second axial end of the shaft, opposite to the first axial end;

a rotor for winding line onto the spool;

a switch means for selectively engaging the spinning reel between a first state or main drag condition in which the spool shaft is prevented from rotating relative to the casing, and a second state in which the spool shaft may be free to rotate or may rotate subject to light drag provided by the adjustable drag mechanism; and a switch mechanism associated with the switch means including a plate or the like being arranged to move parallel to the axial direction of the spool shaft, between a first and a second stable position, and defining an engagement means at one end, wherein when the switch mechanism is in the first of the two stable positions the engagement means is adapted to engage with a mating engagement means in the block to prevent rotation of the block and the spool shaft relative to the switch means and the casing; and wherein the switch mechanism is movable to the second position in which the engagement means is disengaged from the mating engagement means in the block and the block and spool are free to rotate relative to the switch means subject to the adjustable drag mechanism.

Conveniently, the switch mechanism may be stabilised in the first and second positions by at least one leaf spring.

In a preferred embodiment one end of the plate defines the engagement means in the form of a protrusion and the mating engagement means comprise a slot or recess in the block and the switch means which moves the plate parallel to the spool shaft axis, protrudes in a substantially perpendicular direction from the casing of the spinning reel.

It is preferred that the plate defines a protrusion which, when the plate is in the free spool state, is contacted by an engagement surface defined on the main gear of the reel, the arrangement being such that when the gear is rotated in a first direction, for reeling in fishing line, the protrusion is displaced by the surface, and hence the plate is displaced to set the spool to a normal drag state.

Advantageously, the engagement surface is movable relative to the main gear when the reel is switched from the normal drag condition to the free spool condition so that a free spool condition can be set without turning the main gear.

Conveniently, the engagement surface is defined at one end of a claw which is pivotally mounted on the main gear, so that if the main gear is turned in a second direction opposite to the first direction, if the claw contacts the protrusion, the claw deflects to avoid damaging or moving the protrusion.

In an alternative embodiment the plate is moved between the first and second positions by the operation of rotation of a first lever about a first axis.

Preferably, the first lever is fixed to a shaft which is mounted in the main body of the spinning wheel along the axis, the shaft projects outside the main body of the spinning reel and a button or switch is fixed to shaft such that operation of the button or switch causes the main lever to rotate about its axis.

Conveniently, spring biasing means are provided to bias the lever in first and second extreme positions corresponding to the spinning reel being in the first and second states, respectively.

In a preferred embodiment, the plate includes an elongate slot and a projection is fixed to the first lever which projects from the first lever into the slot, the slot defining an engagement surface, being an edge of the elongate slot which is distal from the block, and wherein the projection and the plate are connected by a spring means which biases the projection towards the engagement surface away from the block, the arrangement being such that movement of the projection away from the block causes the projection to contact the engagement surface, and move the plate away from the block, and movement of the projection towards the block moves the plate towards the block or biases the plate to move towards the block through the spring means.

It is preferred that a handle is adapted to turn a main gear of the reel and the main gear of the reel defines one or more cams which are fixed to the main gear, the spinning reel further including:

a second lever mounted for rotation about the axis, an extreme end of the second lever distal from the axis defining an end surface arranged to be contactable with the at least one cam defined on the main gear, the second lever being operatively connected to the first lever by means of a spring means which connects the second lever to a plate means which is integral with and extends generally orthogonally from the first lever;

wherein the plate means is disposed in the path of the second lever as it rotates about the axis and can thus act as a stop plate and prevent the second lever from rotating relative to the first lever, the spring means acting to bias the second lever towards the stop plate;

the arrangement being such that when the reel is in the free spool condition, rotation of the main gear in a first (eg clockwise) direction about its axis causes one of the cams to engage with the end surface defined on the second lever and attempt to cause the second lever to rotate about the first axis in the opposite (ie anticlockwise) direction, but wherein the stop means prevents rotation in that opposite (anticlockwise) direction and further movement of the cam surface in the first (clockwise) direction forces the second lever to rotate in the first (clockwise) direction about the first axis by means of a wedge effect caused by the angle defined by the end surface relative to a tangent to the main gear, thereby setting the spinning reel back to a main drag condition (from the free spool condition).

BRIEF DESCRIPTION OF THE DRAWINGS

The invention will now be described, by way of example only, and with reference to the accompanying drawings, in which.

DETAILED DESCRIPTION OF THE PREFERRED EMBODIMENTS

Figure 1:
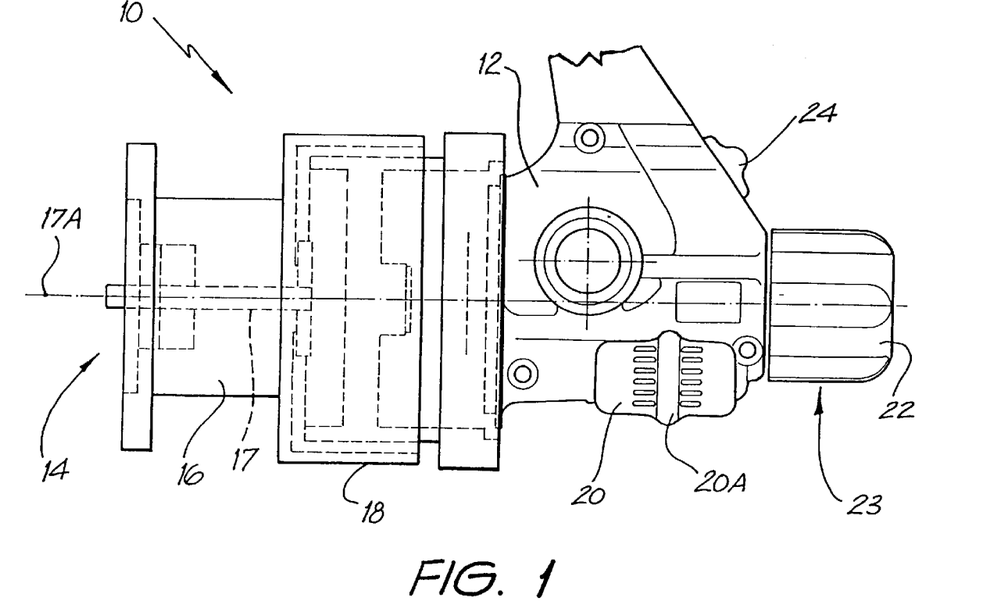
FIG. 1 is a side view of a first embodiment of a spinning reel for fishing.

Referring to the drawings of the first embodiment, FIG. 1 shows a schematic view of the spinning reel, generally indicated at 10, according to a first embodiment of the present invention. The spinning reel includes a main body 12 which at its upper end, not shown, includes a means for attaching the spinning reel to a fishing rod, in the usual manner.

From left to right as oriented in FIG. 1, a front end of the spinning reel defines an adjustable front tension assembly (also referred to as a main drag) generally indicated at 14, which retains a spool 16 on a spool shaft 17. The front tension assembly can be adjusted so that the spool is fixed rotationally relative to the spool shaft or can rotate on and relative to the spool shaft when sufficient torque is applied between the spool shaft and the spool. The spool shaft 17 defines a main longitudinal axis 17A. Adjacent the spool is a rotor assembly 18 which is attached to the main body 12. On one side of the spinning reel body a switch 20 is mounted for operating a mechanism for switching the spinning reel from a "free spool" state to a drag state which will be described in more detail below. At the rear of the spinning reel there is a knob 22 which adjusts an adjustable rear drag assembly 23 which acts on the spool shaft when the reel is in the "free spool" state.

The spinning reel 10 also includes a device for locking the rotor from rotating in a counter clockwise direction, as viewed from the front of the reel, operated by a button 24.

Figure 2:
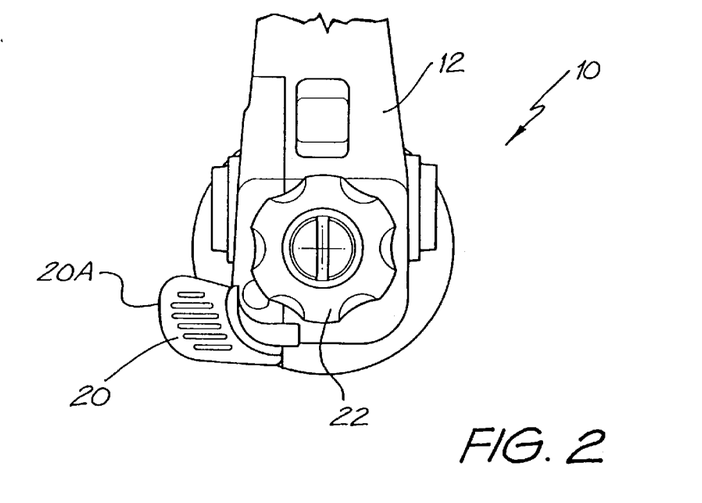
FIG. 2 is a rear view of the reel shown in FIG. 1.

FIG. 2 shows the spinning reel from the rear and in particular illustrates the control knob 22 for the rear drag assembly and the manner in which the central part, 20A, of the button 20 protrudes outwards generally perpendicular to the plane of the side casing of the spinning reel.

The spinning reel includes main gear components for reciprocating the spool 16 and rotating the rotor 18 when the handle of the reel (not illustrated) is turned.

Figure 3:
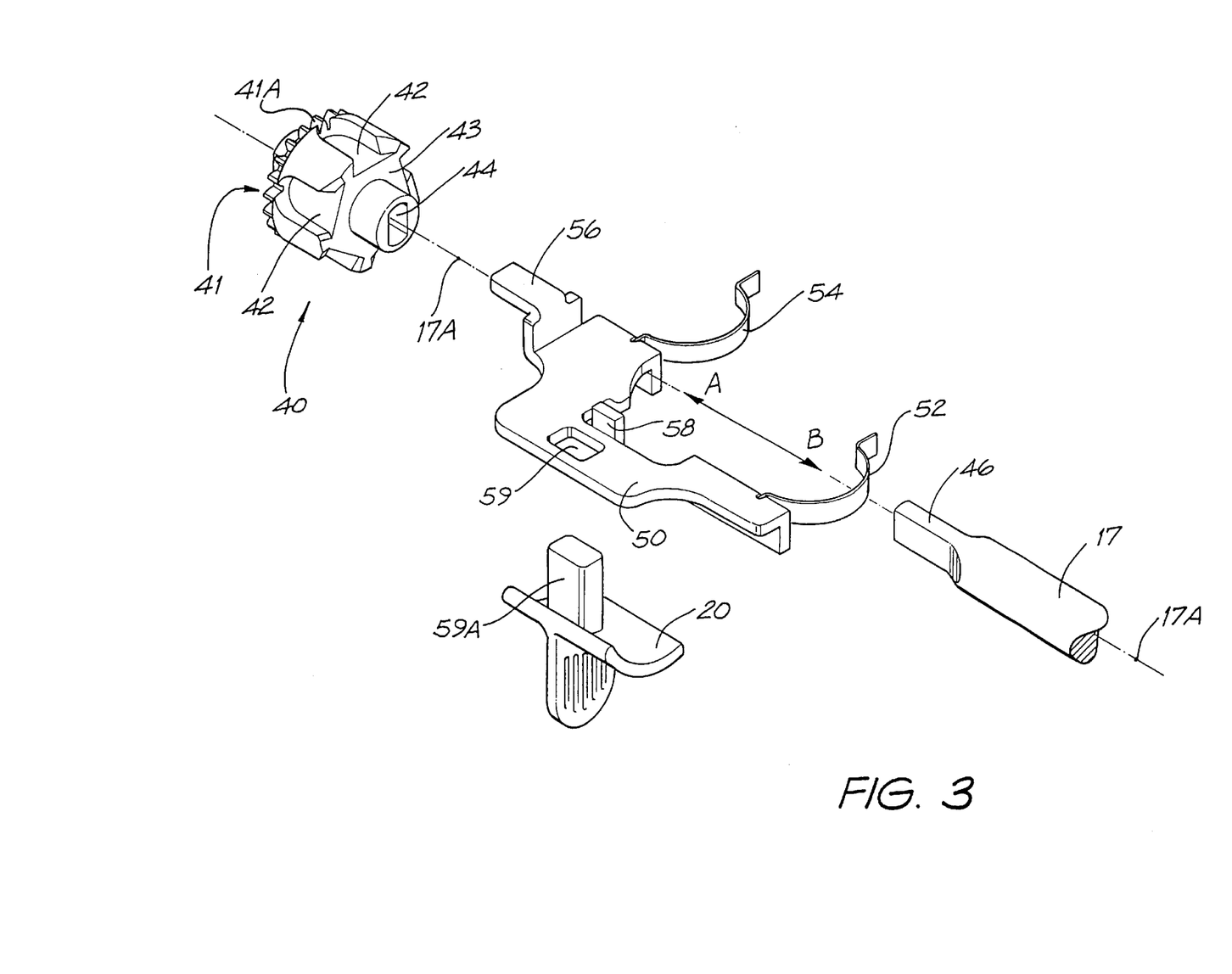
FIG. 3 is an exploded schematic view of components of a mechanism of the first embodiment for switching the spinning reel from a free spool state to a drag state.

FIG. 3 shows the main components of a mechanism for switching the spool from a drag condition to a free spool condition.

All the components are arranged generally on the axis 17A of the spool shaft of the spinning reel. The mechanism includes a core block 40 which forms part of the rear drag assembly 23 and is located generally within the knob 22. The core block 40 is approximately cylindrical. A rear face 41 of the block defines a series of teeth 41A which extend around the rear circumference of the block. A series of five notches 42 in the cylindrical face of the block extend from a front face 43 of the block towards the rear face 41. A slot 44 is defined in the centre of the front face 43. The slot is adapted to receive the rear end 46 of the shaft 17 so that the block 40 and the shaft always rotate together.

The switching mechanism comprises a plate 50 which is arranged to be slideable back and forth in the direction of the longitudinal axis 17A as illustrated by arrows A–B. Two leaf springs 52 and 54 are connected between the plate 50 and to the case/body of the spinning reel to bias the lever so that it will rest at one of two stable positions I and II, illustrated in more detail in FIG. 4.

Figure 4:
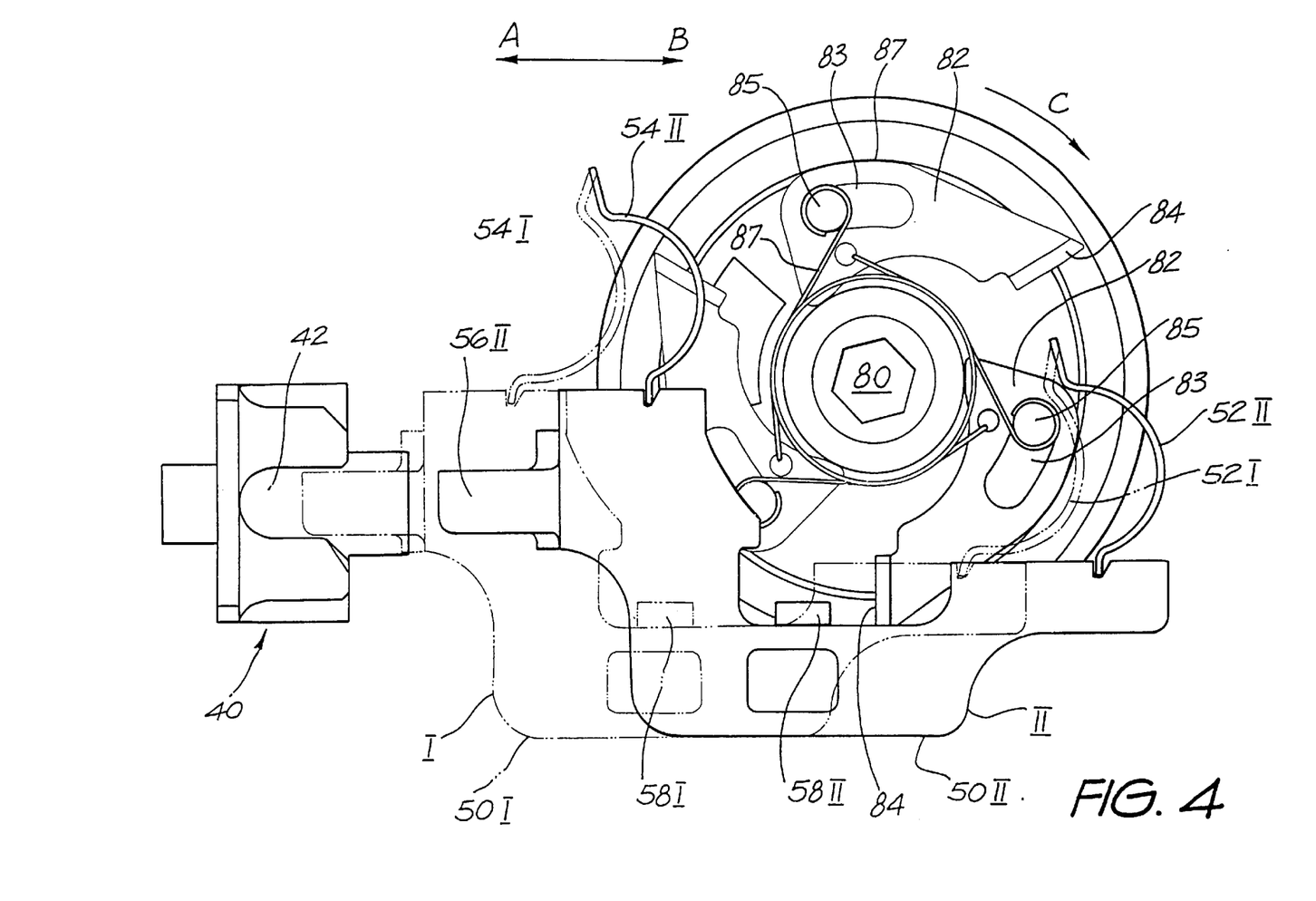
FIG. 4 is a schematic view showing the relationship between the switch assembly and the main gear of the spinning reel in the first embodiment of the present invention.

In position I which is shown in FIG. 4 in phantom, a protrusion 56 on the rear end of the plate 50 fits in one of the five notches 42 in the core block 40. In this condition the block 40 is not able to rotate and therefore neither is the shaft 17 which is rotationally fixed related to the block 40. A protrusion 58 whose function will be described later, projects from the plate in a generally perpendicular direction to the plate.

Returning to FIG. 3, a slot 59 is provided in the plate which receives a protrusion 59A on button 20 to attach the button to the plate.

To set the spinning reel to a free spool condition, the control button and hence the plate, are pushed in the direction B until the plate flips from position I to position II and stays there firmly under the action of the leaf springs 52 and 54. In this condition, the protrusion 56 is no longer resting in one of the notches 42 of the core block and hence the core block and spool are not prevented from rotating relative to the plate. In such a free spool condition the spool which is mounted on the shaft rotate easily and hence pulling fishing line from the spool is easy and provides little resistance. To prevent the spool from moving too freely the adjustable drag assembly 23, best shown in FIGS. 5 and 6 is provided which provides an adjustable drag force mechanism which can be used to inhibit rotation of the spool.

Figure 5:
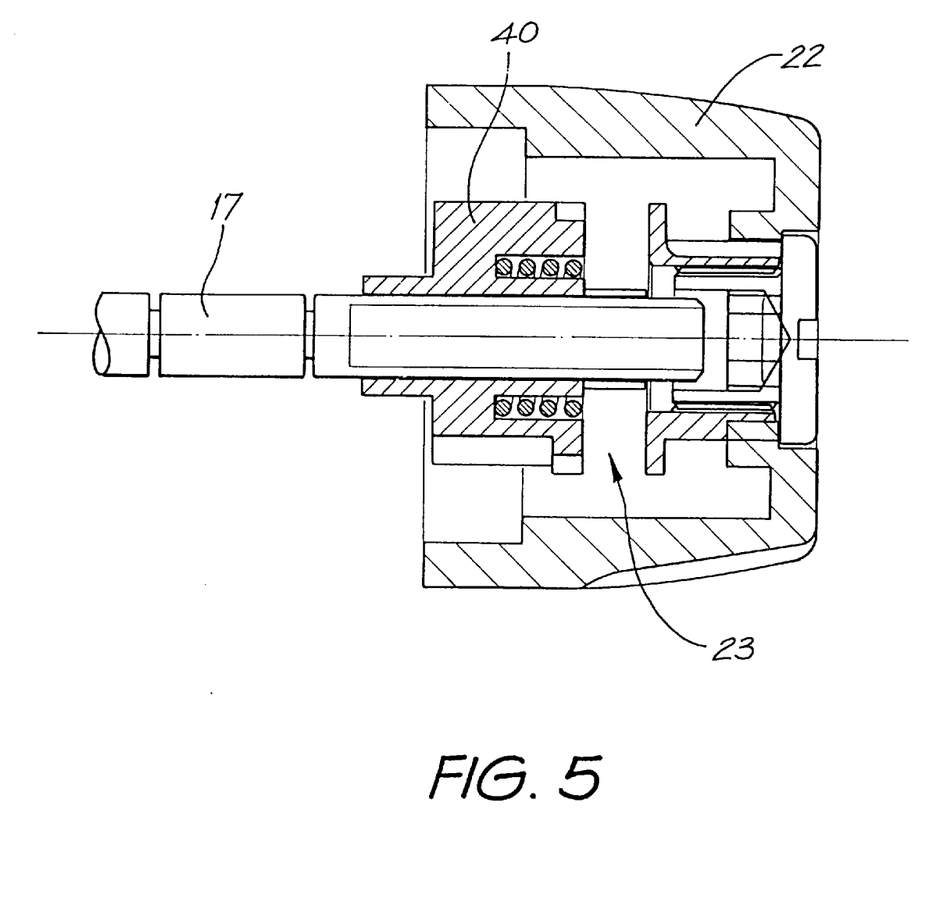
FIG. 5 is a schematic planar section through a rear drag assembly of the spinning reel of FIG. 1.
Figure 6:
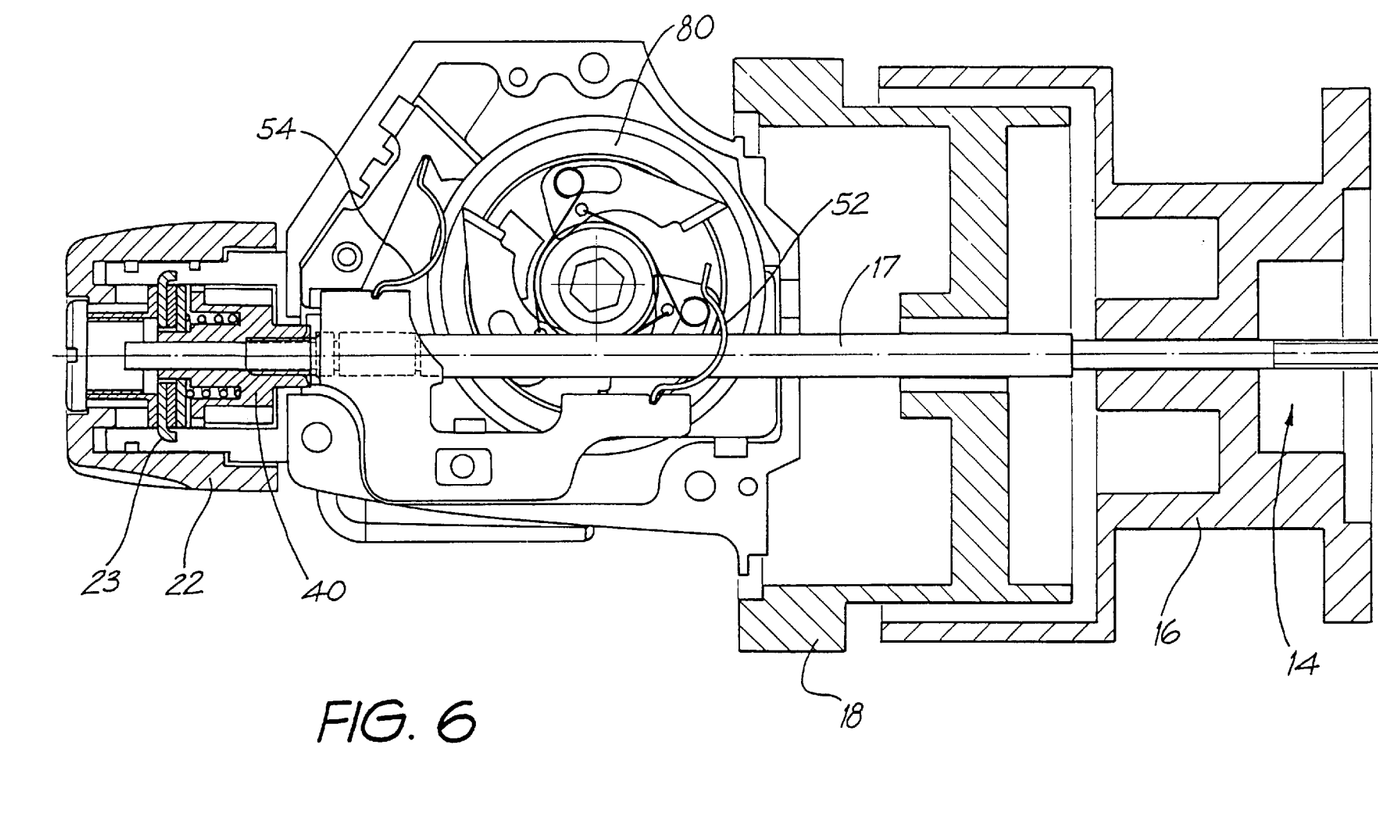
FIG. 6 is a schematic side section view through the first embodiment of the present invention.

The rear drag mechanism is illustrated in more detail in FIG. 5. The particular construction of the mechanism is not a significant feature of the invention and essentially comprises an adjustable friction means for resisting rotating of core block 40, controlled by knob 22.

FIG. 4 shows the main gear 80 of the spinning reel which is turned to reel in fishing line. A series of three claws 82 (one of which is shown bold—the other two faint) are disposed around the main gear 80, each one defining an end surface 84. The claws 82 are generally planar and each claw includes a central arcuate slot 83. A pin or pivot 84 extends through each slot and a spring 87 retains each claw on the pin, as a part of the main gear. When the main gear is rotated in the direction of arrow C when a handle, not shown, is turned, the surface 84 contacts protrusion 58 on the plate to push the lever back to position I in which the spool operates under a main drag conditions in an operation described in more detail below.

Figure 4A:
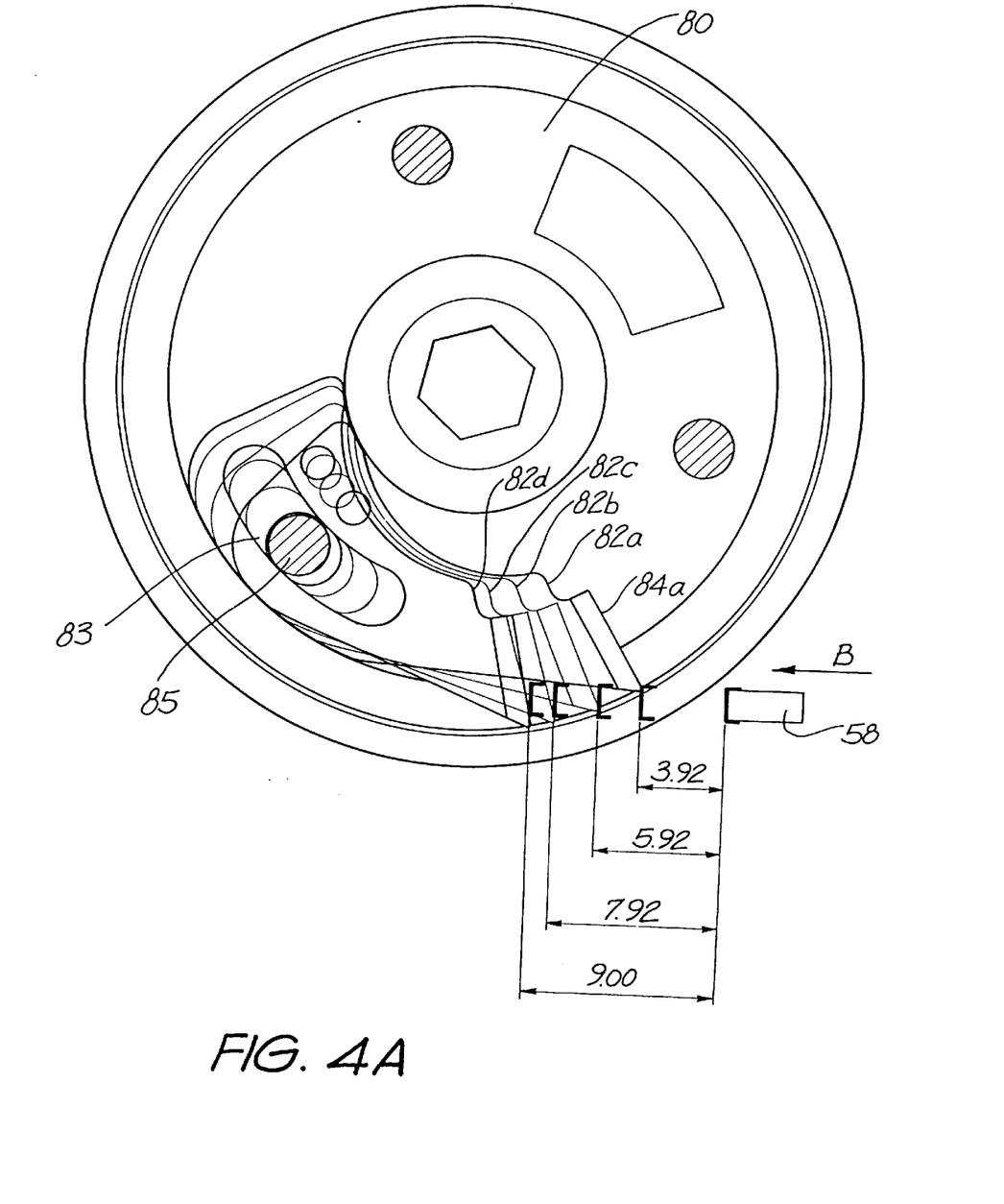
FIG. 4A is a schematic drawing illustrating the inter-engagement of the switch assembly and a claw arrangement on the main gear in the first embodiment of the present invention.

FIG. 4A, illustrates the process for setting the spinning reel to a free spool state. In that Figure, one claw is shown in four positions a, b, c, d as it moves relative to the gear 80. When plate 50 is pushed in direction B to move the reel to a free spool state, the protrusion 58 moves with the plate. If one of the claws were in position 82a, as shown in FIG. 4A, the protrusion 58 contacts end surface 84a of the claw when it has travelled only a short distance, say 3.92 mm, which is insufficient distance to free the protrusion 56 from the block 40, set the reel to a free spool condition.

Once the protrusion 58 contacts the surface 84, the claw 82 is then pushed back relative to the pin 85 until the protrusion has travelled sufficient distance (9 mm) to set the reel to a free spool condition at which time the opposite end of the claw is at position 82d. Intermediate positions are shown in FIG. 4A at 84b and 84c, respectively. The fat that the claw moves relative to the main gear, reduces considerably the effort required to set the free spool state. If the claw were not movable relative to the main gear the main gear would have to be turned to set the reel to free spool condition in the situation described above which would provide significantly greater resistance compared with just moving claw 82.

Figure 4B:
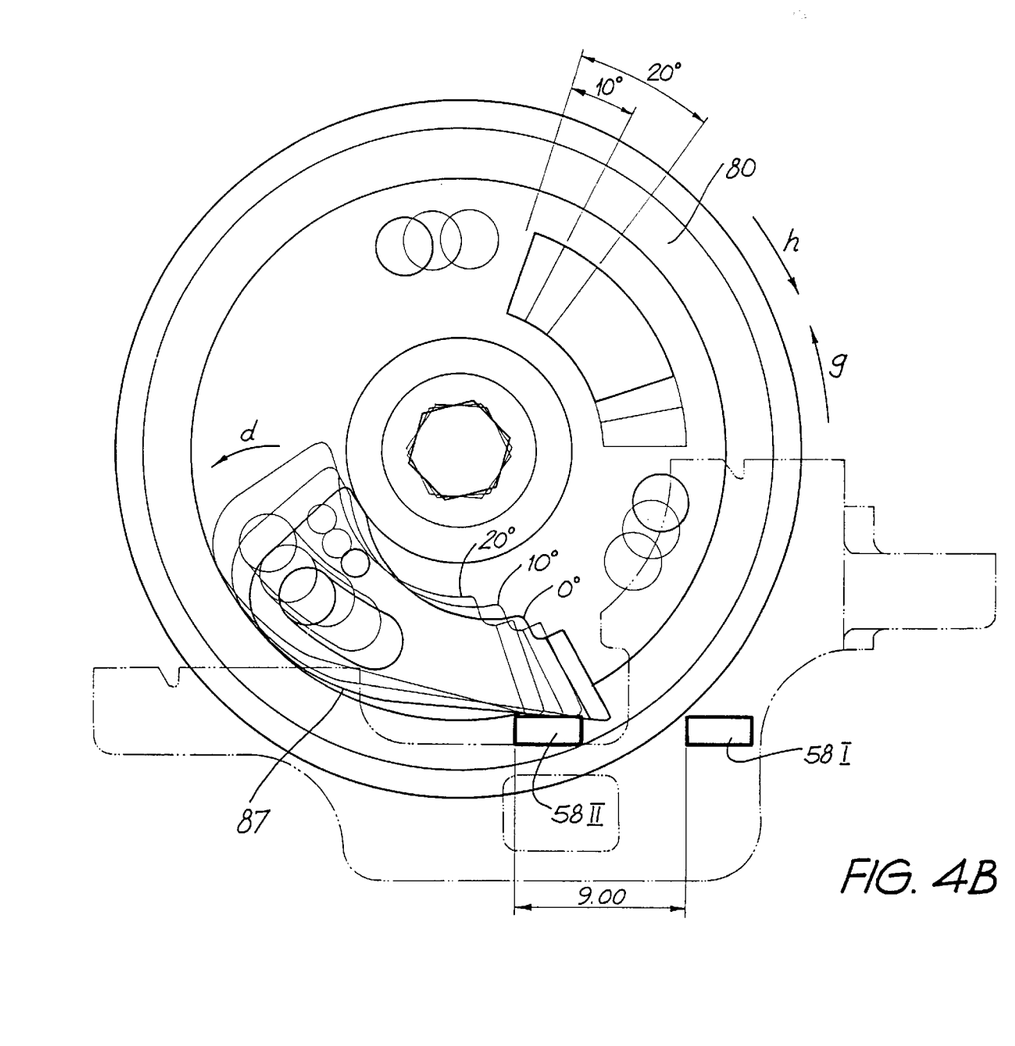
FIG. 4B is a similar view to FIG. 4A.

Referring to FIG. 4B once the lever 50 has been set on free spool position, the protrusion 58 will stay at the position 58H.

If the main gear 80 rotates in direction g, the claw 82 kicks the lever 50 back to position I and during this process, there is not relative rotation between the claw 82 and the main gear 80 about the pivot.

If the main gear 80 is rotated in direction h, the outer peripheral surface 87a will brush against protrusion 58. However, the claw 82 is free to rotate relatively to the main gear 80 about the pivot pin 85 in direction d. The deflection of the claw avoids hard contact which could damage the parts.

Thus, in use a fisherman may cast a line and switch the spinning reel to a free spool condition. When the angler wishes to change the spinning reel to a normal drag condition, for example, to set a hook in a fish after a fish has taken a hook on the cast line that can be done by either pushing the button to flip the lever to position I or by turning the main gear 80 in direction C. (refer to FIG. 4).

The provision of the adjustable drag assembly and switching means in a substantially linear arrangement with the switching means engaging directly in the core block of the adjustable drag mechanism makes the device uncomplicated and relatively cheap and simple to manufacture.

Figure 7:
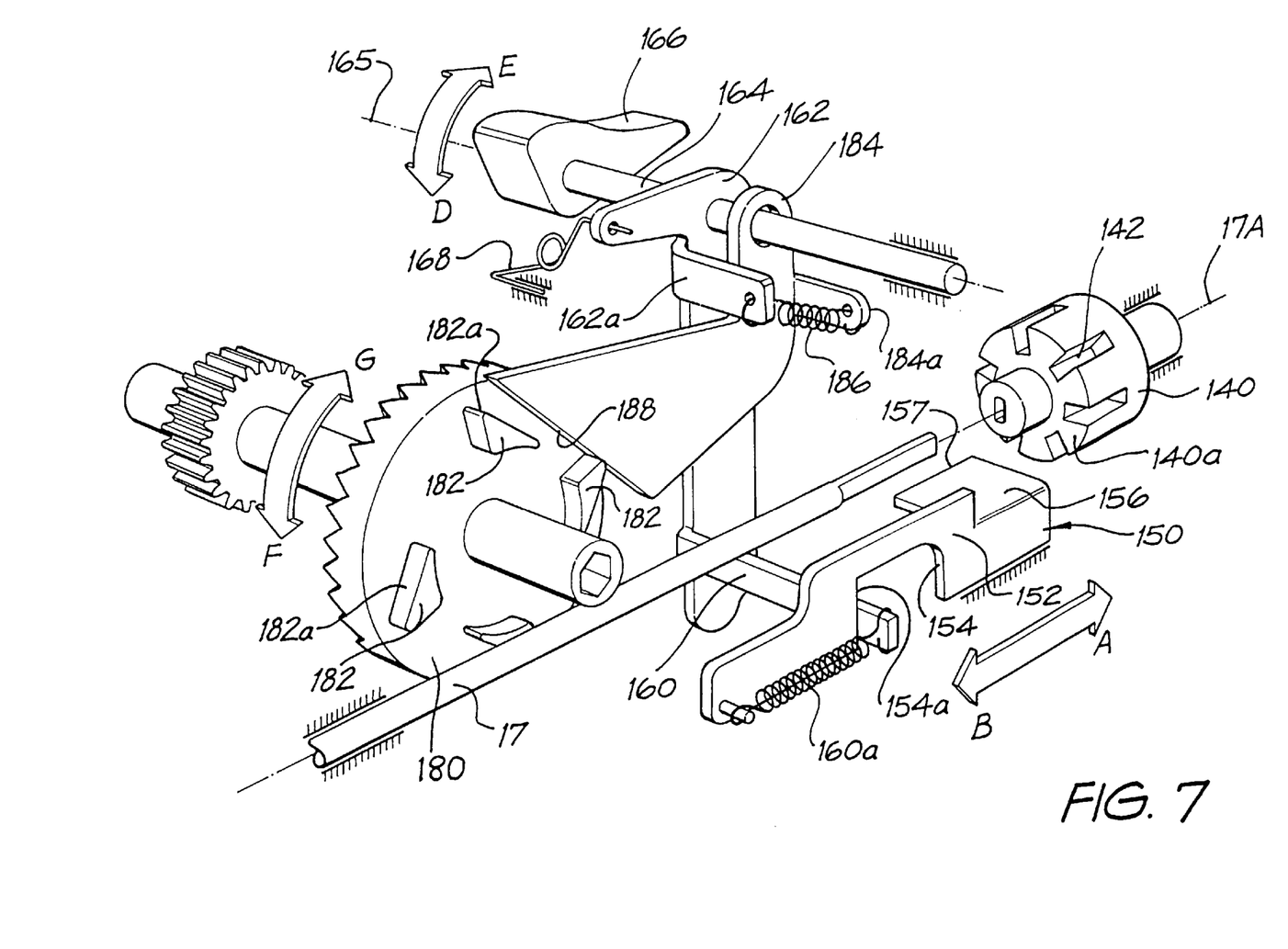
FIG. 7 is an exploded schematic view of components of a second embodiment of a mechanism for switching a spinning reel from a free spool state to a drag state and vice versa.
Figure 7A:
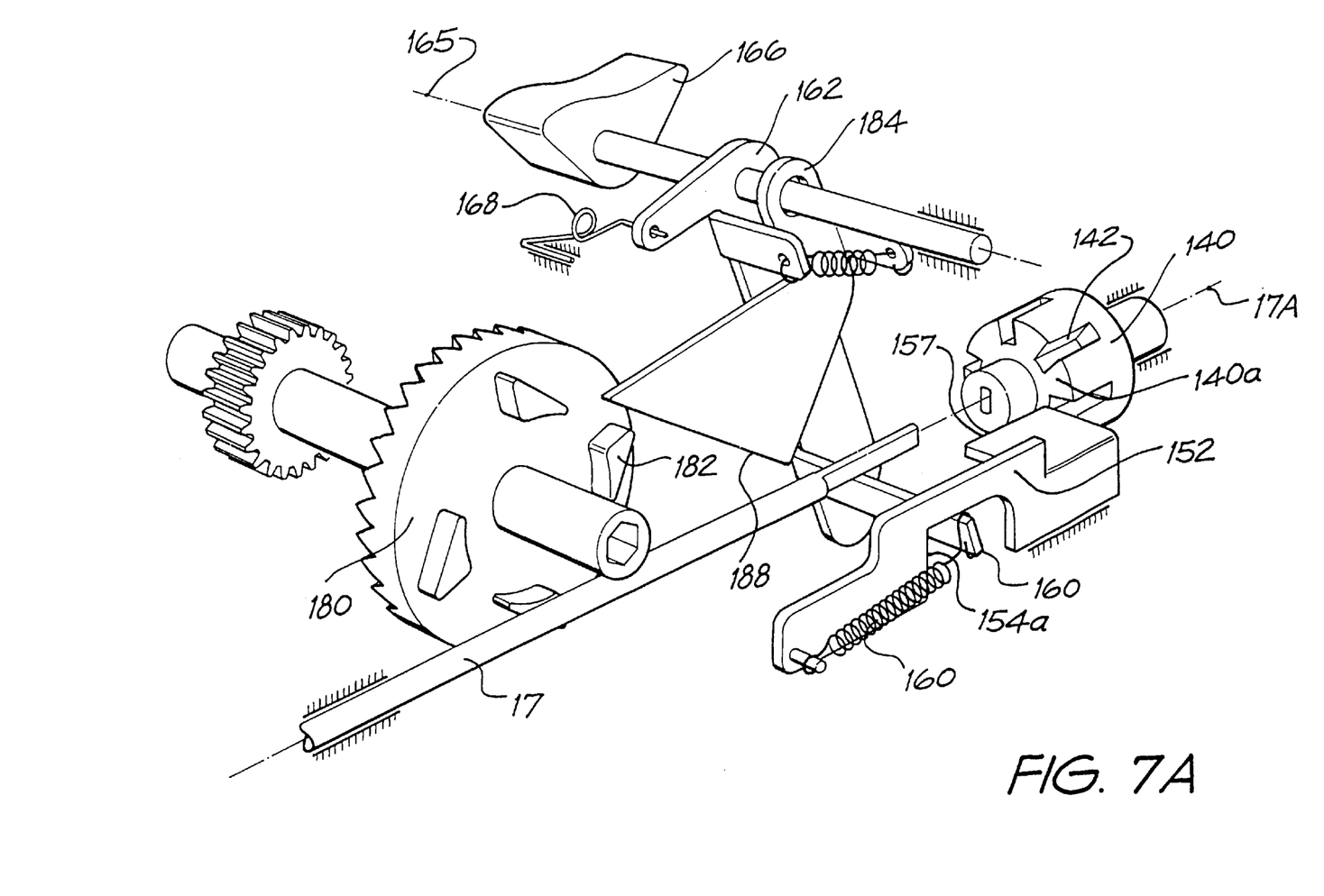
FIG. 7A is a similar view to FIG. 7 but showing the components of the mechanism in different relative positions.
Figure 8A:
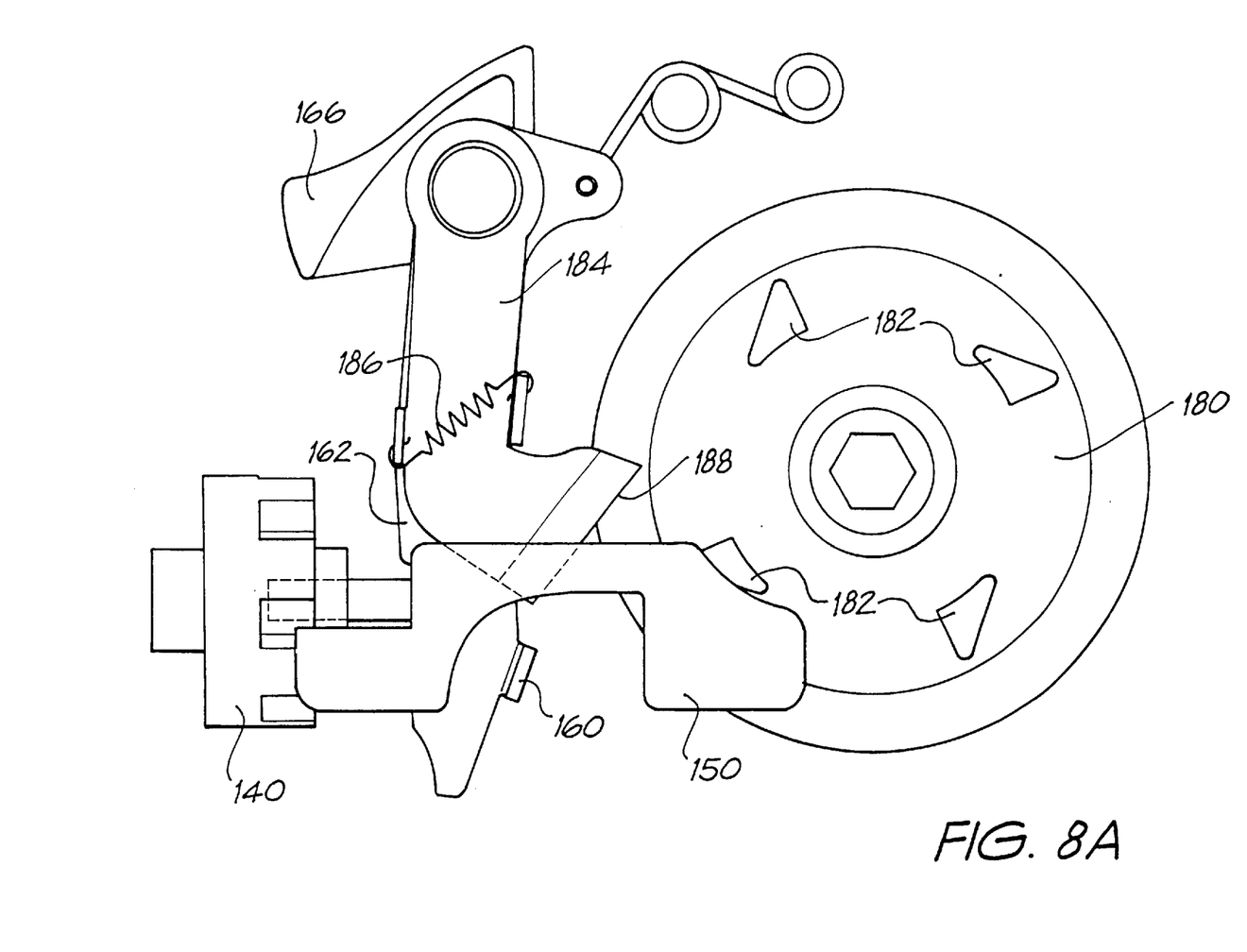
FIG. 8A is a schematic view showing the relationship between the switch assembly of the second embodiment and the main gear of a spinning reel and shown the reel set to a main drag condition.
Figure 8B:
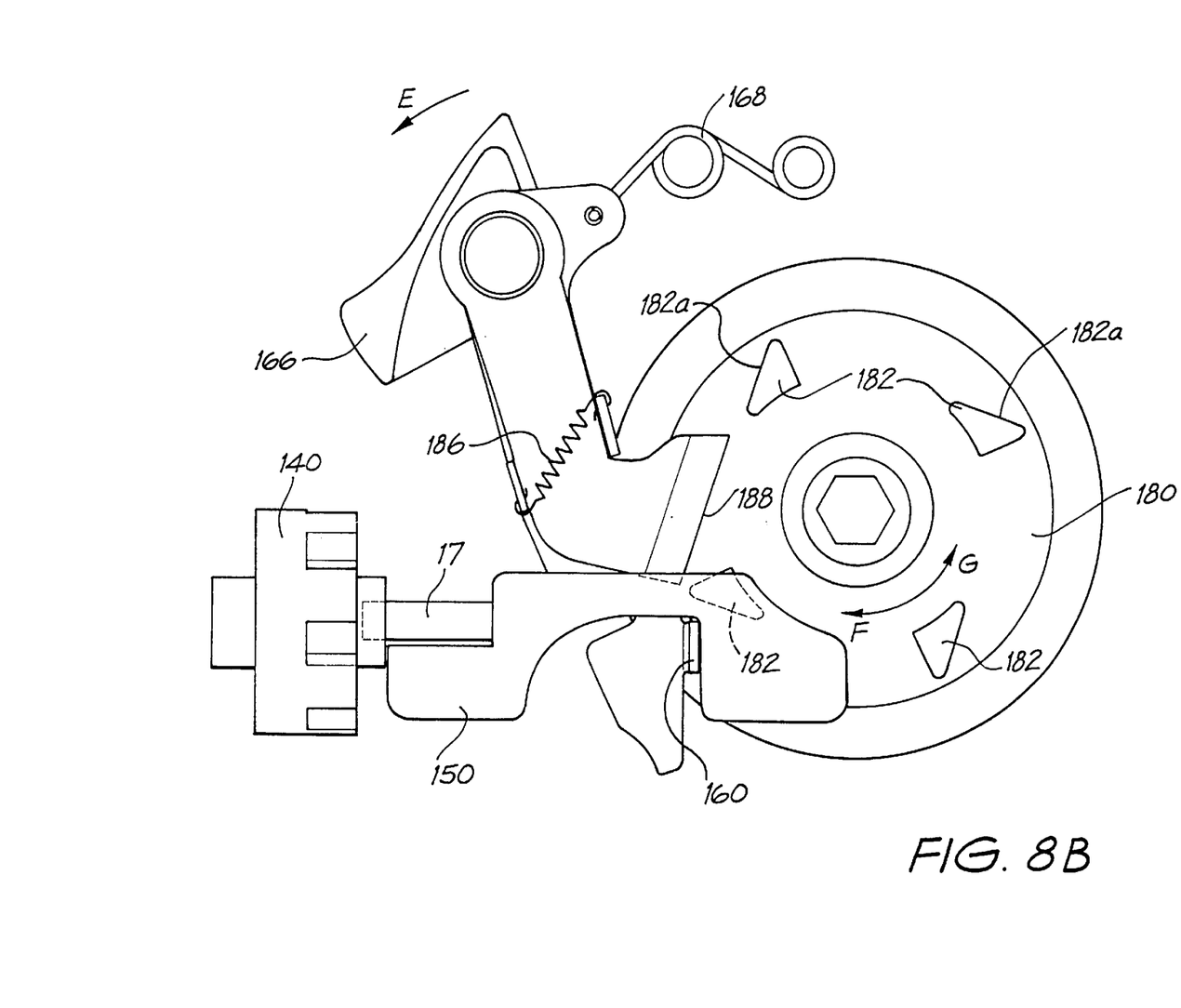
FIG. 8B is a similar view to FIG. 8A, but showing the switch assembly in a free spool position.

FIGS. 7, 8A and 8B show a second embodiment of a spinning reel. In FIGS. 7 to 8B, parts which have corresponding parts in FIGS. 1 to 7 are largely given the same reference numerals as are used for those corresponding components in FIGS. 1 to 7. The spinning reel is visually similar, and similar in overall design to that shown in FIGS. 1 and 2 except that the switch 20 for switching the spinning reel from a free spool state to a main drag state is positioned differently in this second embodiment and the switching mechanism itself is different.

FIG. 7 shows the main components of a mechanism for switching the spool from a drag condition to a free spool condition. The mechanism includes a core block 140 which forms part of a rear drag assembly 23 (not illustrated in FIG. 7 but illustrated in respect of the first embodiment).

The core block 140 is of similar design to the core block 40 shown in FIG. 3. FIG. 7 principally illustrates the differences between the first and second embodiments, and certain features such as teeth for engaging with the micro drag assembly not shown in FIG. 7, for reasons of clarity. As shown, the core block 140 has seven slots, or notches 142, (of which only five are visible in the Figure) in the cylindrical end face 140a of the block. The core block 140 is fixed to the main axle 17 in the same fashion as the first embodiment and the block 140 in the shaft 17 always rotates together about axis 17A.

The switching mechanism comprises a plate 150 which is arranged to be slidable back and forth in the direction of longitudinal axis 17A as illustrated by the arrows A, B.

The plate 150 includes a generally planar section 152 which is vertically oriented as shown in FIG. 7 and in which there is defined a longitudinal slot 154. In the end of the plate adjacent the core block 140 there is a horizontally orientated portion 156, which may be formed by bending the plate, the distal edge 157 of which defines a protrusion which is oriented and located to be engageable in one of the slots 142 in the core block 140.

FIG. 8A illustrates the mechanism when the plate 150 is moved in direction A into engagement with the block 140 ("position A"). FIG. 8B shows the mechanism in "position B" when the plate is disengaged from the block 140.

The plate 150 is moved along the axial direction 17A by movement of a rod or projection 160 which projects into slot 154 and is also connected to the plate 150 by a spring 160a. When the rod 160 is moved in direction B, it contacts one side 154a of the slot 154 to cause the plate to also move in the direction B. When the rod is moved in direction A it pulls the spring 160a and this in turns pulls the plate 150 in direction A. In the event that the protrusion 157 is stopped by the end surface 140a of the core block and does not fit directly into a slot 142, the plate 150 is unable to move further in direction A. In this case, the spring 160a will stretch to allow the rod 160 to move further in direction A so that the rod 160 can reach its designated position. As soon as the block 140 has turned about the axis a sufficient angle so that a slot and the protrusion coincide, the spring will push the protrusion 157 into that slot.

The rod is mounted on, and projects perpendicularly from, a lever 162 which is non-rotatably fixed to an axle 164 which axle is mounted so as to be rotatable about its longitudinal axis 165. A button, or flip button 166 which is located externally of the casing of the fishing reel such that it is accessible by a person operating the reel is also fixed to the shaft 164 such that rotation of the button 166 about axis 165 causes rotation of the lever 162 about the same axis. A spring 168 is mounted between the casing of the reel and the lever 162 and biases the lever, and thus the plate 150 in either position A in which the plate is engaged in the core block, ie in the drag position, shown in FIG. 8A or in position B, the free spool condition in which the plate and core block are disengaged as illustrated in FIG. 8B.

In the normal condition as illustrated in FIG. 8A, the lever 150 is in position A in which the protrusion 157 sits in one of the notches 142, the block cannot rotate relative to the plate. Thus the block is fixed and in this situation the spool works under a main drag condition under the control of the main drag assembly/front tension assembly.

In order to set the spinning reel to a free spool condition B, button 166 is turned clockwise about axis 165 (as oriented in FIG. 7) in the direction E. Lever 162 rotates clockwise about axis 165 (refer to FIG. 7), the rod 160 moves in direction B removing the protrusion 157 from the notch 142 and the rod/plate are retained in position B by the operation of the lever 162 and biasing spring 168.

Thus an angler can cast a line, then set the spinning reel to a free spool condition by use of the button 166: when the fish takes the bait on the end of the line the resistance to the movement of the fishing line is low therefore the hook is more likely to set in the mouth of the fish after which time the angler can then set the line to a main drag condition.

This can either be done by merely flipping the button 166 back in the direction D, or by rotating the main gear 180 which has a mechanism for returning the spinning reel to a main drag condition once the main gear is turned to reel in a fish, as described below.

The mechanism comprises four cams 182 fixed to the main gear. The cams are fixed on the main gear. A further lever 184 is mounted on the shaft 164 but in contrast to lever 162, lever 184 is freely rotatable about the shaft. Lever 184 is linked to lever 162 by means of a spring 186 which is mounted between two plates 184*a* which projects perpendicularly from a distal end of lever 184 and plate 162*a* which projects perpendicularly from a proximal end of lever 162. Lever 162*a* is positioned so that it can abut lever 184. The lever 184 is plate like and generally curved and defines an end surface 188 which, when the lever is the free spool position is contacted by the cam surfaces 182 as the main gear rotates in the direction F (refer to FIG. 8B). In the free spool condition as illustrated in FIG. 8B, the cams impact on the end surface 188 and try to push the lever 184 in an anti-clockwise direction (E) about the axis 165. However the plate 162*a* abuts the lever and the lever is prevented from turning in direction E. As the main gear continues to turn the cam continues to attempt to force the lever to rotate in direction E, which is still opposed by the protrusion 162*a* and the lever 162 which cannot turn in direction E. This causes a wedge effect and the cam forces the surface 188 away in the opposite direction D, as the cam 182 slides along surface 188. Thus the cam forces the lever 184 and 162, to rotate together in direction D. Rod 160 pulls the spring 160*a* which causes the plate 150 to move in direction A and moves the protrusion 157 back into one of the slots 142 in the block 140 to set the spinning reel to a main drag condition.

If the main gear rotates in the opposite direction to direction F, ie direction G, the cams 182 will also impact on surface 188. However, in this case the gently sloping or generally tangential cam surface 182*a* will contact the surface 188 of the lever 184, the lever will rotate about the axis 164 in the direction D with almost no effect on the position of the lever 162 any such slight relative movement being largely smoothed by the spring 186.

The provision of the spring 186 connecting levers 162 and 184 has two main functions. First, it retains the lever 184 in contact with the lever 162 and 162*a* and secondly strengthens the wedge effect described above.

Thus the second embodiment of the present invention also provides an adjustable drag assembly and switching means for a simple uncomplicated design. The majority of the components can simply be stamped out from sheet metal plate which makes the device cheap to manufacture in comparison with existing free spool devices. The size and arrangement of the components also makes the device easy to fit inside a spinning reel body of standard size.

In the specific embodiments described, the main gear has four cams 182, although it will be appreciated that a single cam would suffice and that the number of cams defined on the main gear may be varied. Similarly although the block 140 defines seven slots or notches 142, in fact any number of notches from a single notch upwards, could suffice.

It will be appreciated by persons killed in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A spinning reel for fishing, comprising:

a casing;

a main gear;

a handle shaft arranged to turn the main gear of the reel;

a spool shaft defining a first axial end and a second axial end, said spool shaft being reciprocal in an axial direction during rotation of the handle shaft, a spool provided at said first axial end of the spool shaft mounted on the spool shaft by a front drag assembly, and an adjustable drag mechanism including a block fixed rotationally with respect to the spool shaft and located at the second axial end of the shaft, opposite to the first axial end;

a rotor for winding fishing line onto said spool;

a switching means for selectively engaging the spinning reel between a first state being a main drag condition, in which the spool shaft is prevented from rotating relative to the casing, and a second state being a free spool state in which the spool shaft may be substantially free to rotate or may rotate subject to light drag provided by, and depending on the setting of, the adjustable drag mechanism;

the switching means including a switch mechanism, said switch mechanism including a plate which is mounted to move parallel to the axial direction of the spool shaft, between a first and a second stable position, said plate defining an engagement means at one of its ends, wherein when said switch mechanism is in the first of the two stable positions the engagement means engages with a mating engagement means in the block to prevent rotation of the block and the spool shaft relative to the switch means and the casing to cause the spinning reel to be in the main drag condition; and wherein the switch mechanism is movable to the second stable position in which the engagement means is disengaged from the mating engagement means in the block, and the block and spool are free to rotate relative to the switch means to cause the spinning reel to be in the free spool state; and further comprising a return means associated with the main gear of the reel for switching the spool from the free spool state to the main drag condition when the handle shaft is rotated in a direction to reel fishing line onto the spool.

2. A spinning reel as claimed in claim 1, wherein the engagement means comprising a protrusion and wherein the mating engagement means comprises a slot or recess defined in the block.

3. A spinning reel as claimed in claim 2, wherein the switching means which moves the plate parallel to the spool shaft axis, defines a button which projects away from the casing of the spinning reel in a direction which is substantially perpendicular to a plan defined by a part of the casing adjacent the button.

4. A spinning reel as claimed in claim 1 wherein a handle is adapted to turn a main gear of the reel and the main gear of the reel defines at least one engagement surface which is attached to the main gear but displaceable relative to the main gear between predetermined limits, and wherein the switching mechanism defines a protrusion which, when the reel is in the free spool state is contactable by the engagement surface defined on the main gear of the reel, whereby when the reel is switched from the first state, to the second state, the second state can be set without turning the main gear by means of displacement of the engagement means relative to the main gear.

5. A spinning reel as claimed in claim 1 wherein the plate is moved between the first and second positions by a first lever which rotates about an axis.

6. A spinning reel as claimed in claim 5 wherein spring biasing means are provided to bias the first lever and second extreme positions corresponding to the spinning reel being in the first and second states, respectively.

7. A spinning reel as claimed in claim 6 wherein the plate includes an elongate slot and a projection is fixed to the first lever which projects from the first lever into the slot, the slot defining an engagement surface, the engagement surface comprising an edge of the elongate slot which is distal from the block, and wherein the projection and the plate are connected by a first spring means which biases the projection towards the engagement surface and away from the block, whereby movement of the projection away from the block causes the projection to contact the engagement surface, and move the plate away from the block, and movement of the projection towards the block causes a biasing force which moves the plate towards the block through the first spring means.

8. A spinning reel as claimed in claim 7 wherein the first lever is fixed to a shaft which is mounted in the casing of the spinning reel and defines the axis and wherein the shaft projects outside the casing of the spinning reel and a switch is fixed to the shaft such that operation of the switch causes the main lever to rotate about its axis.

9. A spinning reel as claimed in claim 8 wherein a handle is adapted to turn a main gear of the reel and wherein the main gear of the reel defines at least one cam which is fixed to the main gear, the spinning reel further including:

a second lever mounted for rotation about the axis, an extreme end of the second lever distal from the axis defining an end surface arranged to be contactable with at lest one said cam defined on the main gear, the second lever being connected to the first lever by a second spring means which connects the second lever to a plate means which is integral with and extends generally orthogonally from the first lever;

wherein the plate means is disposed in the path of the second lever as the second lever rotates about the axis and acts as a stop plate to limit the rotation of the second lever relative to the first lever, the spring means acting to bias the second lever towards the stop plate;

whereby when the reel is in the free spool condition, rotation of the main gear in a first direction about its axis causes said at least one cam to engage with the end surface defined on the second lever and exert a force on the second lever to rotate about the first axis in the opposite direction, the stop means movement of the cam surface in the first direction forcing the second lever to rotate in the first direction about the first axis by means of a wedge effect between the cam and the end surface due to an angle defined by the end surface relative to a tangent to the main gear, thereby setting the spinning reel back to a main drag condition.

10. A spinning reel for fishing as claimed in claim 9 wherein said at least one cam defines a leading edge which is substantially radial to the main gear and a generally tangential outer edge.

11. A spinning reel for fishing, comprising:

a casing;

a main gear;

a handle shaft arranged to turn the main gear of the spinning reel;

a spool shaft defining a first axial end and a second axial end, said spool shaft being reciprocal in an axial direction during rotation of the handle shaft, a spool provided at said first axial end of the spool shaft mounted on the spool shaft by means of an adjustable main drag assembly, and an adjustable drag mechanism including a block fixed rotationally with respect to the spool shaft and located at the second axial end of the shaft, opposite to the first axial end;

a rotor for winding fishing line onto said spool;

a switching means for selectively engaging the spinning reel between a first state being a main drag condition, in which the spool shaft is prevented from rotating relative to the casing, and a second state being a free spool state in which the spool shaft may be free to rotate or may rotate subject to light drag provided by the adjustable drag mechanism;

the switching means including a switch mechanism, said switch mechanism comprising a plate which is moveable parallel to the axial direction of the spool shaft, between a first and a second stable position, and defines a protrusion at one distal end;

a lever rotatable about an axis and operably connected to the plate such that the plate is moved between the first and second stable positions by means of rotation of the lever about the axis;

wherein when said switch mechanism is in the first of the two stable positions the protrusion engages with a mating engagement means comprising a slot or recess defined in the block which prevents rotation of the block and the spool shaft relative to the switch means and the casing in which position the spinning reel is in a main drag condition; and wherein the switch mechanism is movable to the second position in which the protrusion is disengaged from the mating engagement means in the block, in which position the spinning reel is in the free spool state, and the block and spool are free to rotate relative to the switch means subject to the adjustable drag mechanism; and further comprising a return means associated with the main gear of the reel for switching the spool from the free spool state to the main drag condition when the handle shaft is rotated in a direction to reel fishing line onto the spool.

12. A spinning reel as claimed in claim 11 wherein the plate includes an elongate slot and a projection is fixed to the lever which projects from the lever into the slot, the slot defining an engagement surface, the engagement surface comprising an edge of the elongate slot which is distal from the block, and wherein the projection and the plate are connected by a first spring means which biases the projection towards the engagement surface and away from the block, whereby movement of the projection away from the block causes the projection to contact the engagement surface, and move the plate away from the block, and movement of the projection towards the block causes a biasing force which moves the plate towards the block through the spring means.

13. A spinning reel as claimed in claim 12 wherein a handle is adapted to turn the main gear of the reel and wherein at least one cam is fixed to the main gear, the spinning reel further including:

a second lever mounted for rotation about the axis, an extreme end of the second lever distal from the axis defining an end surface arranged to be contactable with said at least one cam defined on the main gear, the second lever being connected to the first lever by a second spring means which connects the second lever to a plate means which is integral with and extends generally orthogonally from the first lever;

wherein the plate means is disposed in the path of the second lever as the second lever rotates about the axis and acts as a stop plate to limit the rotation of the second lever relative to the first lever, the second spring means acting to bias the second lever towards the plate means;

whereby when the reel is the free spool condition, rotation of the main gear in a first direction about its axis causes one of the cams to engage with the end surface defined on the second lever and attempt to cause the second lever to rotate about the first axis in the opposite direction, the stop means preventing rotation in the opposite direction, further movement of the cam surface in the first direction forcing the second lever to rotate in the first direction about the first axis by means of a wedge effect between the cam and the end surface thereby setting the spinning reel back to the man drag condition.

14. A spinning reel for fishing comprising:

a casing;

a handle shaft arranged to turn a main gear;

a spool shaft defining a first axial end and a second axial end, said spool shaft being reciprocal in an axial direction during rotation of the handle shaft;

a spool mounted on said first axial end of the spool shaft by a main drag assembly, and an adjustable drag mechanism including a block fixed rotationally with respect to the spool shaft and located at the second axial end of the shaft, opposite to the first axial end;

a rotor for winding fishing line onto said spool;

a switching means for selectively engaging the spinning reel between a main drag condition, in which the spool shaft is prevented from rotating relative to the casing, and a free spool state in which the spool shaft is subject to any drag provided by the adjustable drag mechanism;

the switching means including a switch mechanism, said switch mechanism being mounted to move parallel to the axial direction of the spool shaft, between a first and a second position, and defining an engagement means at one of its ends;

wherein when said switch mechanism is in the first of the two positions the engagement means engages with a mating engagement means in the block to prevent rotation of the block and the spool shaft relative to the switch means and the casing; and wherein the switch mechanism is movable to the position in which the engagement means is disengaged from the mating engagement means in the block, and the block and spool are free to rotate relative to the second means subject to the adjustable drag mechanism; and further comprising a return means associated with the main gear of the reel for switching the spool from the free spool state to the main drag condition when the handle shaft is rotated in a direction to reel fishing line onto the spool.

15. A spinning reel as claimed in claim 14 wherein the plate is moved between the first and second positions of a first lever which rotates about an axis.

16. A spinning reel as claimed in claim 15 wherein spring biasing means are provided to bias the first lever in first and second extreme positions corresponding to the spinning reel being in the main drag condition and free spool states, respectively.

17. A spinning wheel as claimed in claim 16 wherein the first lever is fixed to a shaft which is mounted in the casing of the spinning reel and defines the axis and wherein the shaft projects outside the casing of the spinning reel and a switch is fixed to the shaft such that operation of the switch causes the main lever to rotate about its axis.

18. A spinning reel as claimed in claim 17 wherein a handle is adapted to turn a main gear of the reel and wherein the main gear of the reel defines at least one cam which is fixed to the main gear, the spinning reel further including:

a second lever mounted for rotation about the axis, an extreme end of the second lever distal from the axis defining an end surface which is contactable with at least one cam defined on the main gear, the second lever being connected to the first lever by a spring means which connects the second lever to a plate means which is integral with and extends generally orthogonally from the first lever;

wherein the plate means is disposed in the path of the second lever as it rotates about the axis and acts as a stop plate to limit the rotation of the second lever relative to the first lever, the spring means acting to bias the second lever towards the stop plate;

the arrangement being such that when the reel is in the free spool condition, rotation of the main gear in a first direction about its axis causes said at least one cam to engage with the end surface defined on the second lever and exert a force on the second lever to rotate about the first axis in the opposite direction, but the stop means preventing rotation in the opposite direction, further movement of the cam surface in the first direction forcing the second lever to rotate in the first direction about the first axis by means of a wedge effect between the cam and the end surface due to an angle defined by the end surface relative to a tangent to the main gear, thereby setting the spinning reel back to a main drag condition.

19. A spinning reel for fishing as claimed in claim 18 wherein each cam defines a leading edge which is substantially radial to the main gear and a generally tangential outer edge.

* * * * *